United States Patent [19]
Chang

[11] Patent Number: 5,865,142
[45] Date of Patent: Feb. 2, 1999

[54] APPARATUS FOR HATCHING EGGS

[76] Inventor: Chih-Hsiung Chang, P.O. Box 82-144, Taipei, Taiwan

[21] Appl. No.: 964,404

[22] Filed: Nov. 4, 1997

[51] Int. Cl.⁶ .......................... A01K 41/02; A01K 41/06
[52] U.S. Cl. ............................................ 119/318; 119/324
[58] Field of Search .................................. 119/318, 319, 119/324, 325, 308

[56] References Cited

U.S. PATENT DOCUMENTS

| | | | |
|---|---|---|---|
| 1,308,995 | 7/1919 | Russell | 119/324 |
| 3,783,832 | 1/1974 | Marsh | 119/319 |
| 4,606,299 | 8/1986 | Grumbach | 119/311 |

*Primary Examiner*—Michael J. Carone
*Assistant Examiner*—Yvonne R. Abbott
*Attorney, Agent, or Firm*—A & J

[57] ABSTRACT

An apparatus for hatching eggs includes a rectangular casing having a top provided with a pre-heating chamber in which is mounted a first electric fan and a water tray under the electric fan, an air compressor arranged on the top and connected with the pre-heating chamber via a pipe, a cooling water container installed on the top and connected with the water tray via a pipe, a second electric fan installed on a first inner end of the rectangular casing, and a third electric fan installed on a second inner end of the rectangular casing, whereby the hatching rate of eggs and the grown-up rate of fowls can be largely increased.

14 Claims, 17 Drawing Sheets

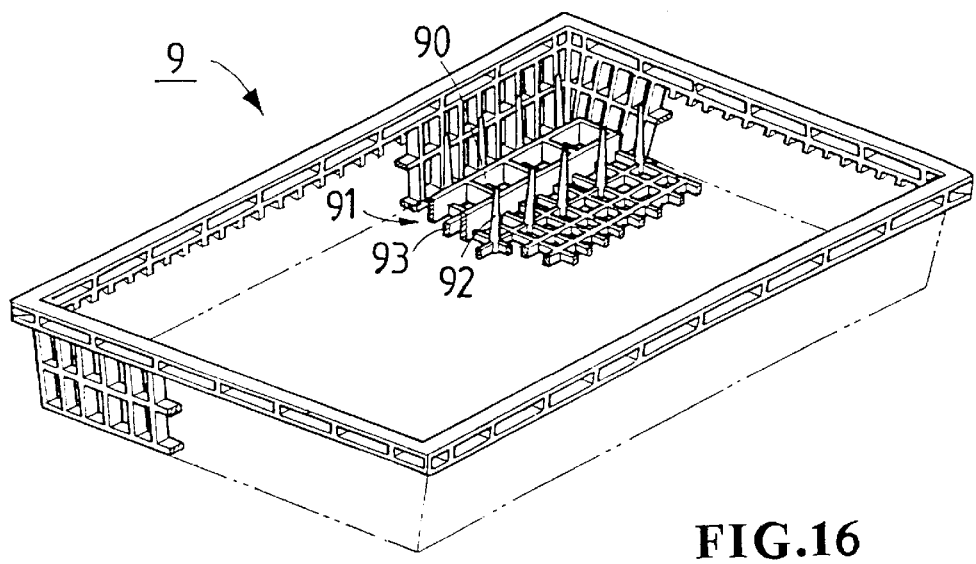
FIG.16
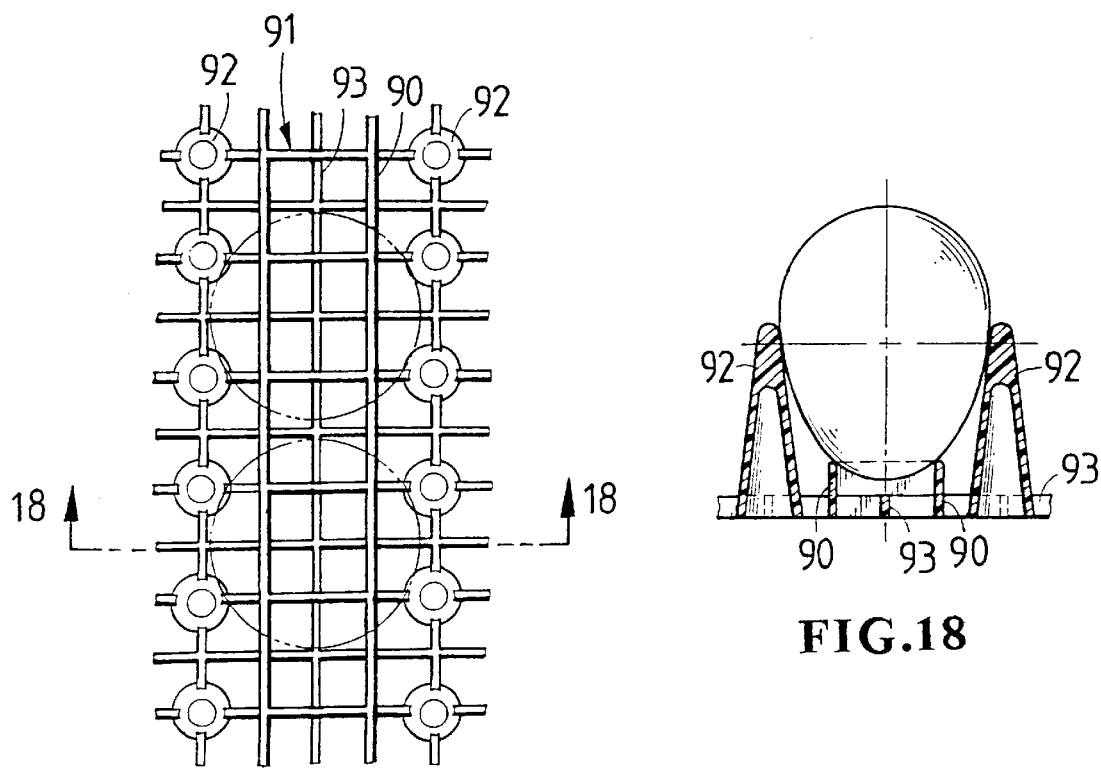
FIG.17
FIG.18

APPARATUS FOR HATCHING EGGS

FIELD OF THE INVENTION

This invention is related to an apparatus for hatching eggs and in particular to one which can increase the hatching rate of eggs and the grown-up rate of fowls.

FIELD OF THE PRIOR ART

The conventional apparatus 2 for hatching eggs (see FIGS. 1 and 2) generally includes a rectangular casing, two doors 21 in the front, two water trays 20 at the bottom, three heating devices 25 arranged at two sides and the intermediate position of the bottom, two fans 22 at two opposite sides, and an electric motor 23 installed outside the rectangular casing and drivingly connected to the fans 22 via a pulley 24 and an inner shaft 26. The inner shaft 26 is fitted within an outer shaft 11 on which are mounted two egg racks 1. The outer shaft 11 has a sector gear 12 at an end which is meshed with a worm rod 13 driven by an electric motor 14 and a reduction gear 15 so that when the electric motor 14 is turned on, the egg racks 1 will be rotated.

In winter, the humidity in the water tray 20 will be too low and so it is necessary to add water to the water tray 20 manually thereby causing much inconvenience in operation. Furthermore, the relative humidity will be higher than 80% in summer and so even if the water tray 20 is removed from the apparatus in summer, the water contained in air will be still high than the normal standard by 65% so that the humidity problem cannot be effectively solved.

Moreover, the egg rack 1 includes a plurality of hatching trays 31 (see FIG. 3) which have a rectangular frame 311 provided with a transverse plate 312 and a plurality of longitudinal metal wires 313 for receiving eggs. FIG. 4 illustrates another conventional hatching tray 32 which includes a rectangular frame 321 provided with a horizontal positioning plate 322 formed with a plurality of circular holes 323 for receiving eggs.

The eggs must be removed to a bearing tray 33 (see FIG. 5) two days before being hatched. FIG. 6 illustrates another commonly used bearing tray 34. The bearing trays 33 and 34 cannot be replaced with the hatching tray 33 as it is unnecessary for the bearing trays to keep the egg at a fixed position so that the young can easily come out of the egg.

Nevertheless, the conventional apparatus for hatching eggs suffers from the following drawbacks:

1. The belt will become loose after having used for a certain period of time thereby producing noise and therefore requiring regular adjustment.
2. The humidity in the water tray cannot be adjusted and it is often necessary to add water manually to the water tray.
3. The heating plate is arranged at the bottom of the apparatus and so the heat is concentrated at the lower portion of the apparatus hence causing an obvious temperature difference in the apparatus and influencing the growing rate of the egg.
4. The egg will become higher in temperature (about 97–99.5 degrees F.) in the tenth day from the date of hatching and so it is necessary for the operator to spray water over the egg thereby increasing his burden.
5. The apparatus is of right angles which will block the circulation of air current in the apparatus.
6. As the cage is fixedly mounted within the apparatus, it is necessary for the operator to push the egg trays into the apparatus and arrange the egg trays into the cage.
7. The egg rack is driven by gears and worm rods which will easily break down thereby increasing the maintaining cost.
8. As the hatching egg tray is made of metal, it will easily corrode.
9. The hatching egg is complicated in structure, which increases the cost and renders it unfit for mass production.
10. The ventilation of the hatching tray shown in FIG. 4 is insufficient, resulting in the death of the egg. Though the hatching tray shown in FIG. 3 can solve this problem, the capacity thereof is largely reduced.
11. The hatching tray shown in FIG. 4 cannot keep an egg firmly therein and so the egg will often drop down when the hatching tray is rotated to the position above 85 degrees.
12. The hatching tray cannot be used as a bearing tray.
13. The conventional bearing tray is bulky in volume, making it difficult to stow when not in use.
14. The bearing tray is made of metal which will easily corrode and heavy and difficult to manufacture.
15. The bearing tray is bulky in volume.
16. The bearing tray cannot be replaced with the hatching tray.

Therefore, it is an object of the present invention to provide an improved apparatus for hatching eggs which can obviate and mitigate the above-mentioned drawbacks.

BRIEF DESCRIPTION OF THE DRAWINGS

FIG. 16 is a perspective view of the hatching tray;

FIG. 17 is a fragmentary top view of the hatching tray;

FIG. 18 is a sectional fragmentary view of the hatching tray;

SUMMARY OF THE INVENTION

Figure 1:
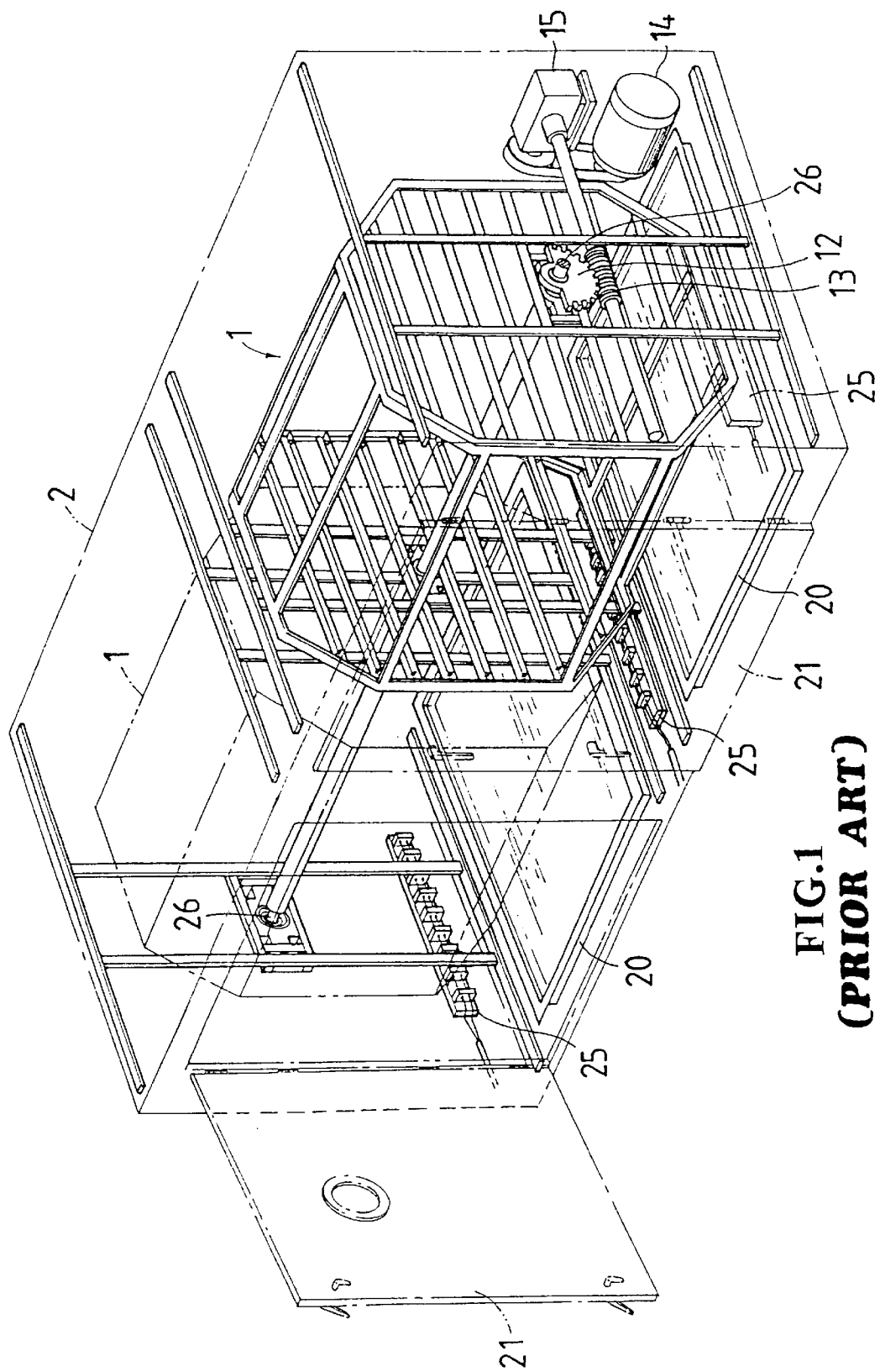
FIG. 1 illustrates the structure of a prior art apparatus for hatching eggs.
Figure 2:
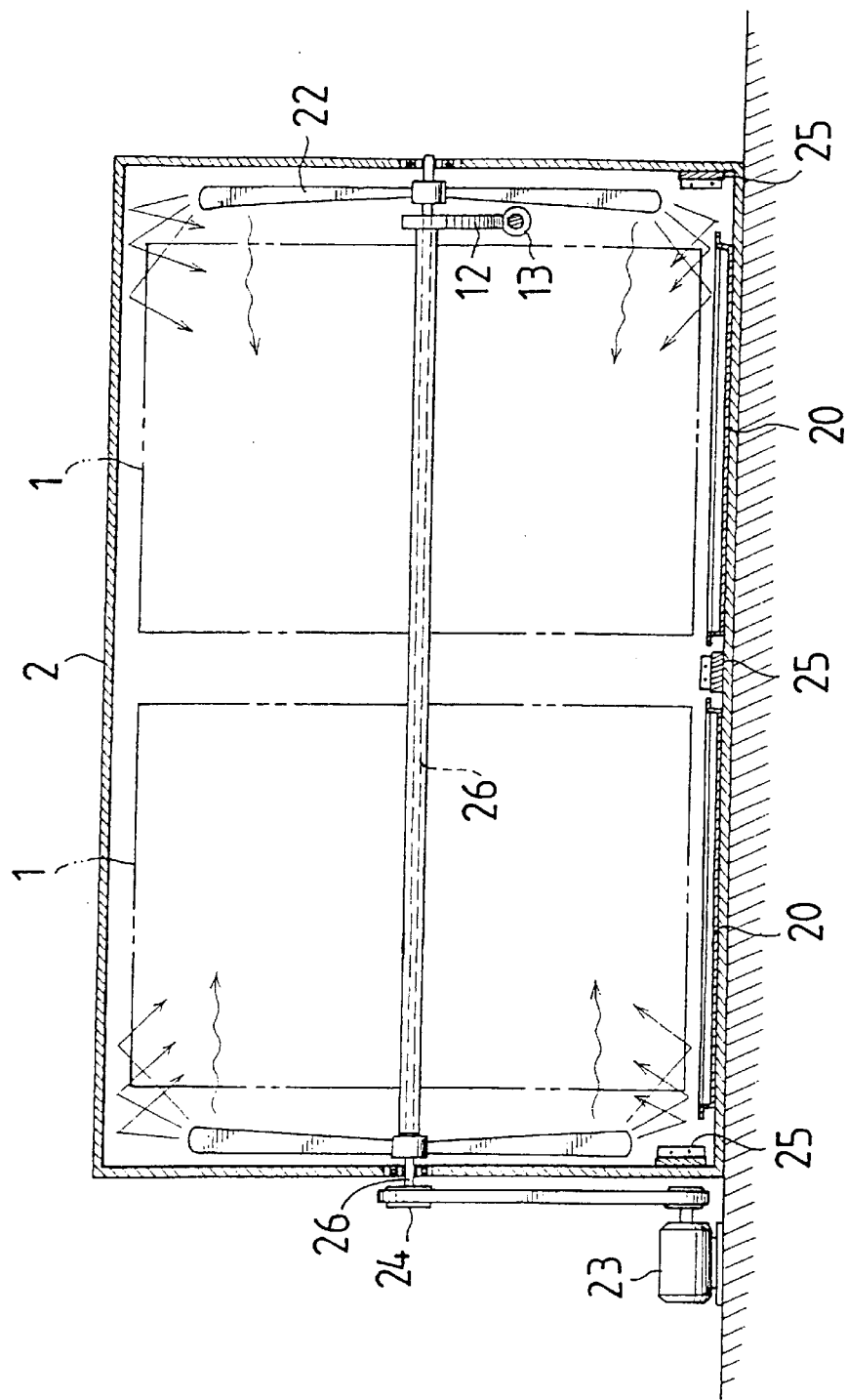
FIG. 2 is a sectional front view of the prior art apparatus for hatching eggs.
Figure 3:
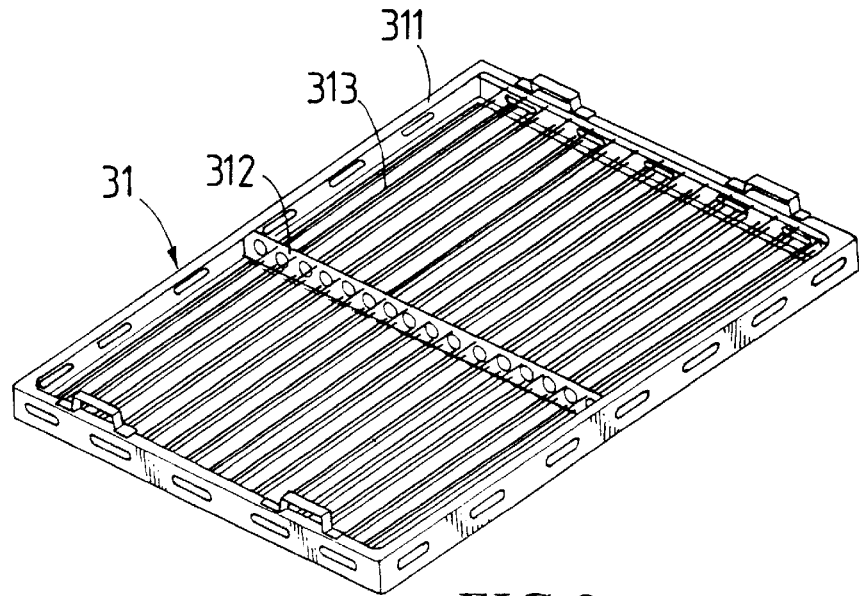
FIG. 3 is a perspective view of a prior art hatching tray.
Figure 4:
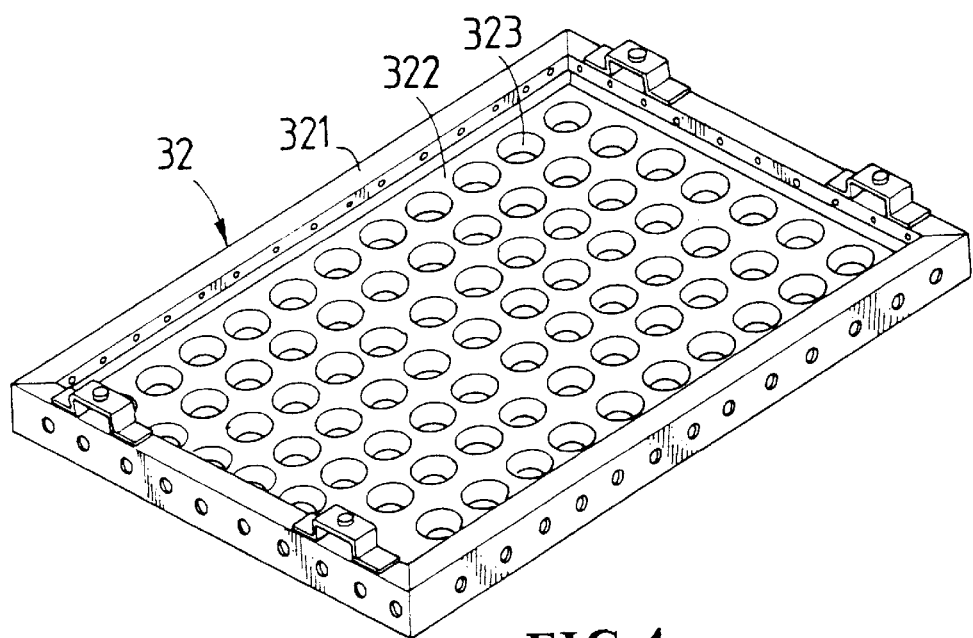
FIG. 4 is a perspective view of another prior art hatching tray.
Figure 5:
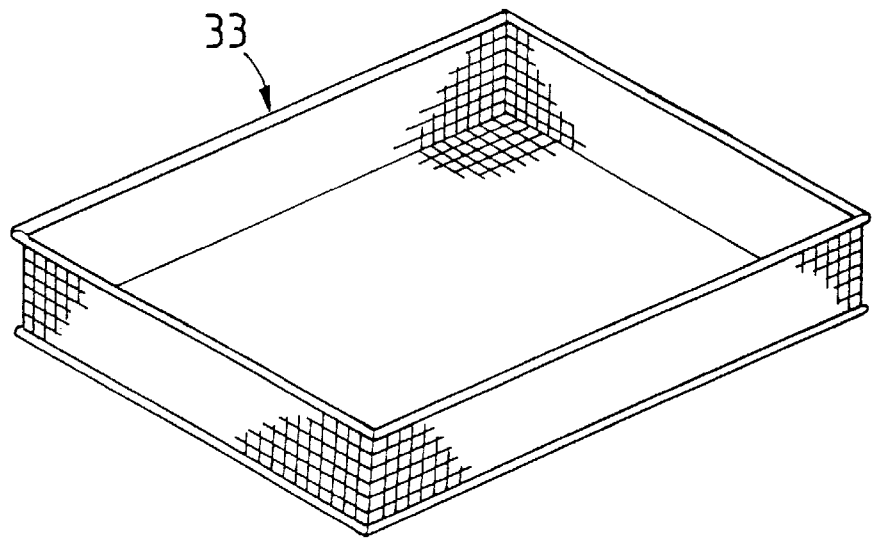
FIG. 5 is a perspective view of a prior art bearing tray.
Figure 6:
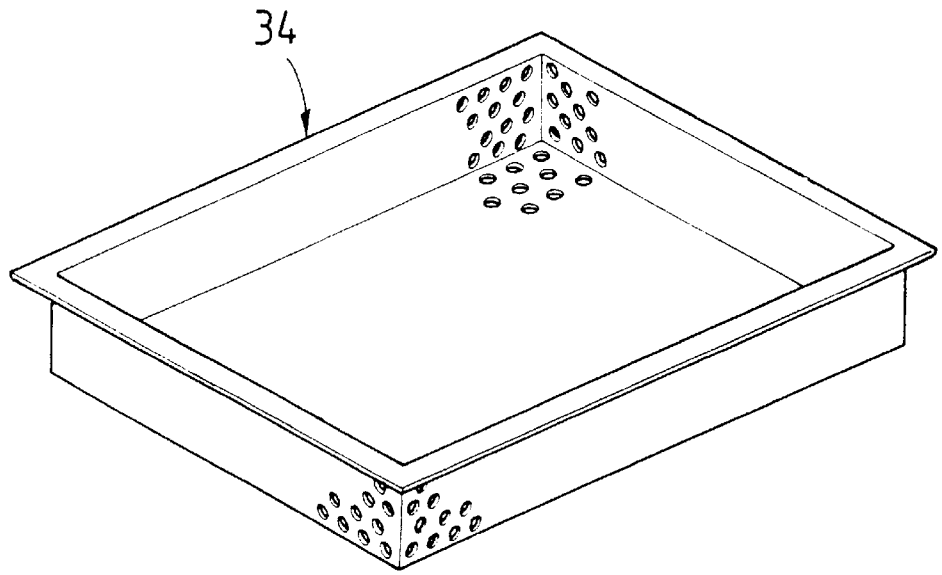
FIG. 6 is a perspective view of another prior art bearing tray.

This invention is related to an improved apparatus for hatching eggs.

It is the primary object of the present invention to provide an improved apparatus for hatching eggs which can increase the hatching rate of eggs.

It is another object of the present invention to provide an improved apparatus for hatching eggs which can increase the grown-up rate of fowls.

It is still another object of the present invention to provide an improved apparatus for hatching eggs which can automatically control the temperature and humidity for hatching eggs.

It is still another object of the present invention to provide an improved apparatus for hatching eggs which utilizes a hair collector to filter the air flowing out of the apparatus thereby preventing air pollution.

It is a further object of the present invention to provide an improved apparatus for hatching eggs which is practical in use.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numberals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 7:
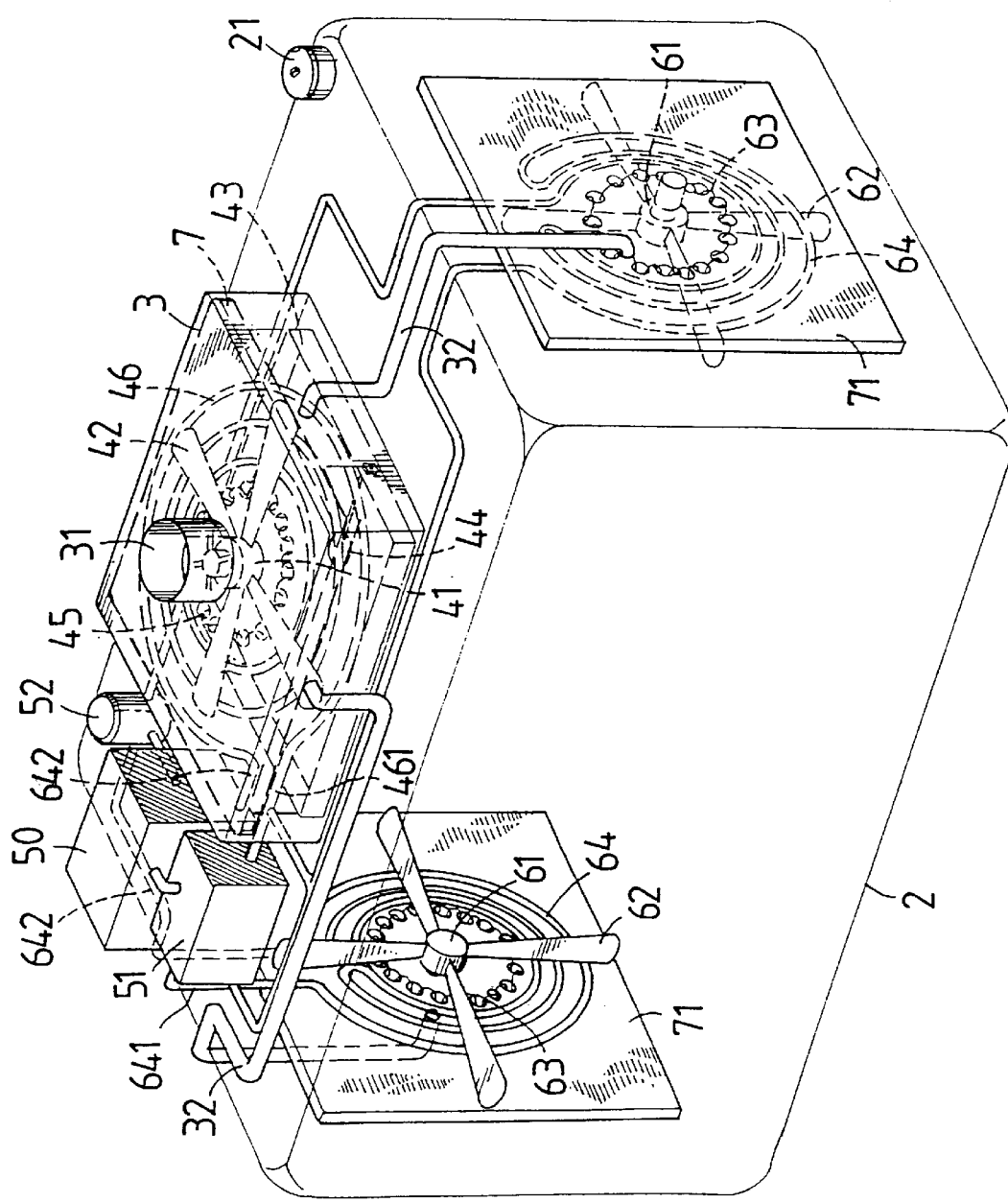
FIG. 7 is a perspective view of an apparatus for hatching eggs according to the present invention.
Figure 8:
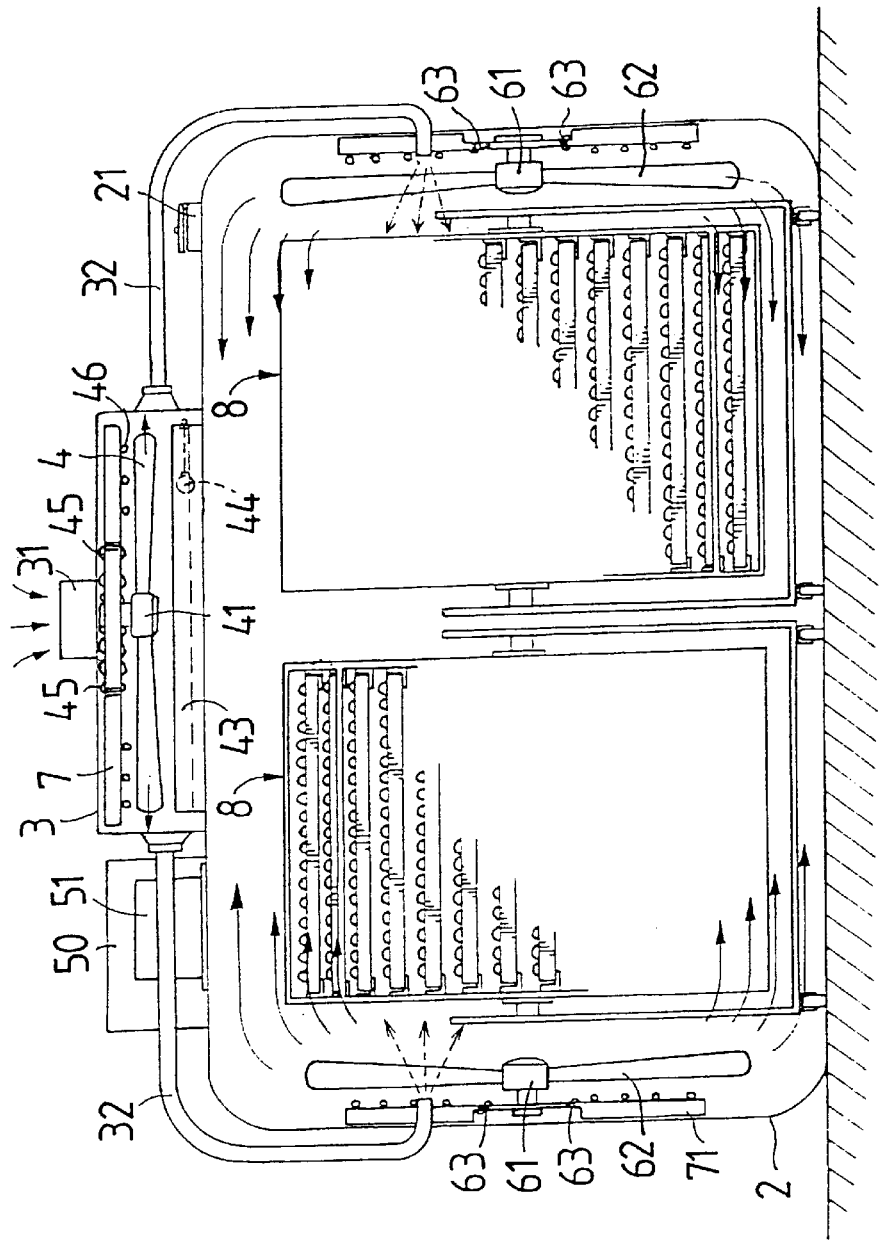
FIG. 8 is a sectional front view of the apparatus for hatching eggs according to the present invention.
Figure 9:
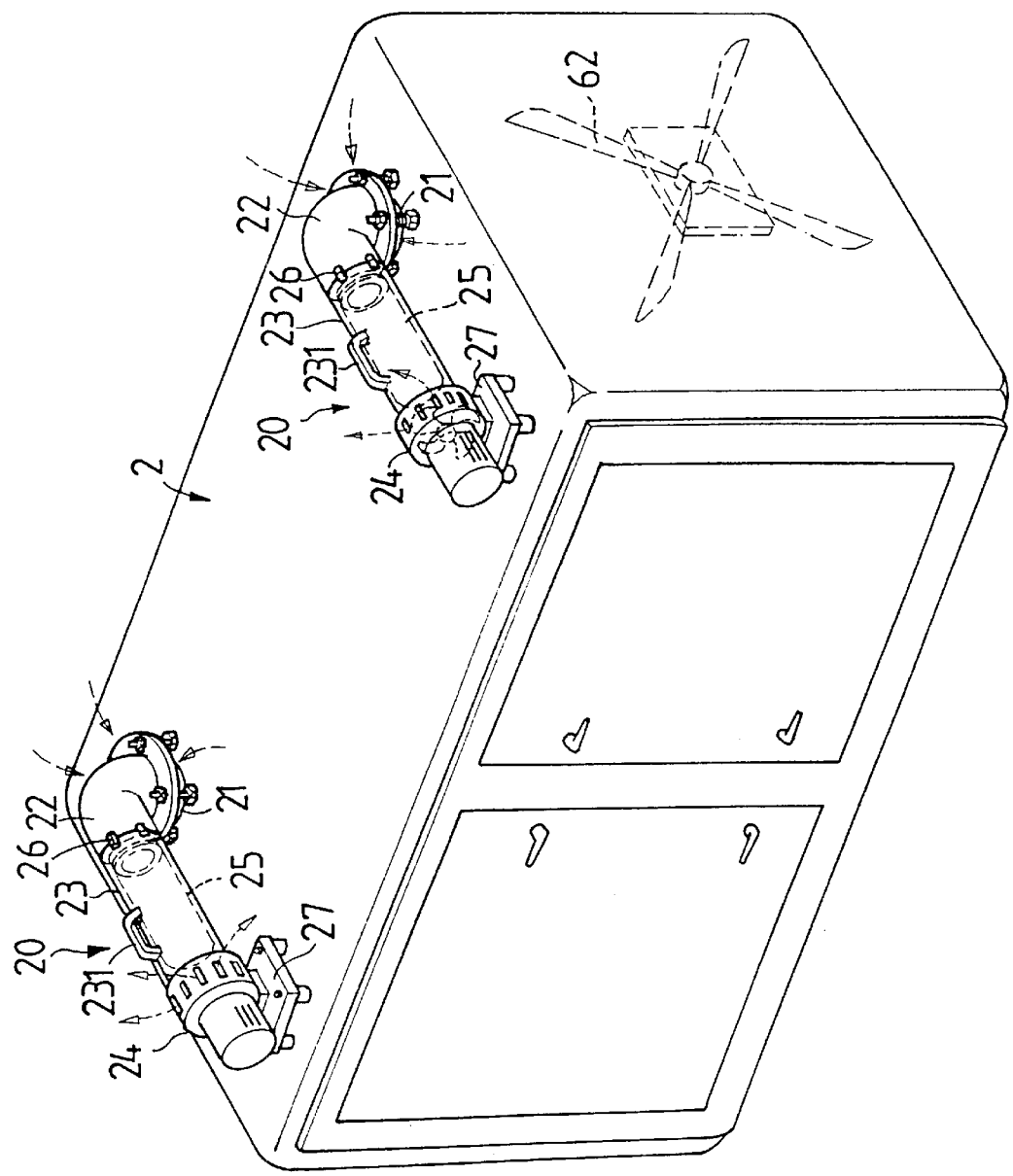
FIG. 9 illustrates the structure of the hair collector.

With reference to the drawings and in particular to FIGS. 7 and 8 thereof, the apparatus for hatching eggs according to the present invention comprises a rectangular casing 2 provided on the top with a pre-heating chamber 3, a cooling water container 50 and a compressor 51, a water pump 52, and two adjustable air outlets 21 (see FIGS. 7 and 9). Within two opposite lateral inner sides of the apparatus are mounted two ceramic plates 71. On the central portion of each of the two ceramic plates 71 is mounted an electric motor 61 which are connected with a plurality of blades 62. A heating element 63 is arranged on the ceramic plate 71 in a circular manner. On the ceramic plate 71 is installed a cooling pipe 64 surrounding the heating element 63.

The top of the pre-heating chamber 3 has an adjustable air inlet 31 under which there is a ceramic plate 7. An electric motor 41 which is provided with blades 42 is mounted at the central portion of the ceramic plate 7. A water tray 43 is disposed at the bottom of the pre-heating chamber 3. A float-ball valve 44 is fitted within the pre-heating chamber 3 so that when the lower level within the water tray 43 falls below the predetermined level, the float-ball valve 44 will be opened to supplement water to the water tray 43. A heating element 45 and a cooling pipe 46 surrounding the electric motor 41 are mounted on the ceramic plate 7. The cooling pipe 46 has an inlet 461 connected to the compressor 52 and the cooling water container 50.

The pre-heating chamber 3 is provided with two air outlets 32 at two sides so that the air current produced by the fan 42 can flow out thereof. Two inlet pipes are mounted on two sides of the apparatus and located close to the two ceramic plates 71. When air flows into the apparatus 2, the air will be further blown all over the apparatus 2 by the fan 62. As the air must flow through the pre-heating chamber 3, the temperature and humidity of the air can be adjusted as desired. Furthermore, all inner corners of the apparatus are rounded in shape thereby smoothing the flow of air current.

The method of how to dehumidify the air will be described hereinafter by way of the following example:

Generally, the hatching temperature within a hatching apparatus is around 97–100 degrees F. (depending the category of the eggs) and the saturated steam is 36 g/m3. When the temperature within the pre-heating chamber 3 is 28 degrees C., the saturated steam will be 27 g/m3. As the relative humidity of the pre-heating chamber 3 may be up to 90–95%, the actual water contained in the steam will be equal to 27×90%=24.3 g/m3. If the actual water contained in the steam is transmitted into the apparatus 2, the relative humidity within the apparatus will be changed to 24.3/36× 100%=67.5% which will be the most appropriate value for hatching eggs.

If the temperature of the pre-heating chamber 2 is set at 26 degrees C., the air temperature will be cooled down to 26 degrees C. by the cooling pipe of the pre-heating chamber 3 when the outside temperature is above 30 degrees C. in humid summers. If the outside temperature and humidity are too low in winters, the pre-heating chamber 3 will be automatically heated to 26 degrees C. to keep the air at a desired condition. The above-mentioned operation can be easily controlled by a computer.

Figure 10:
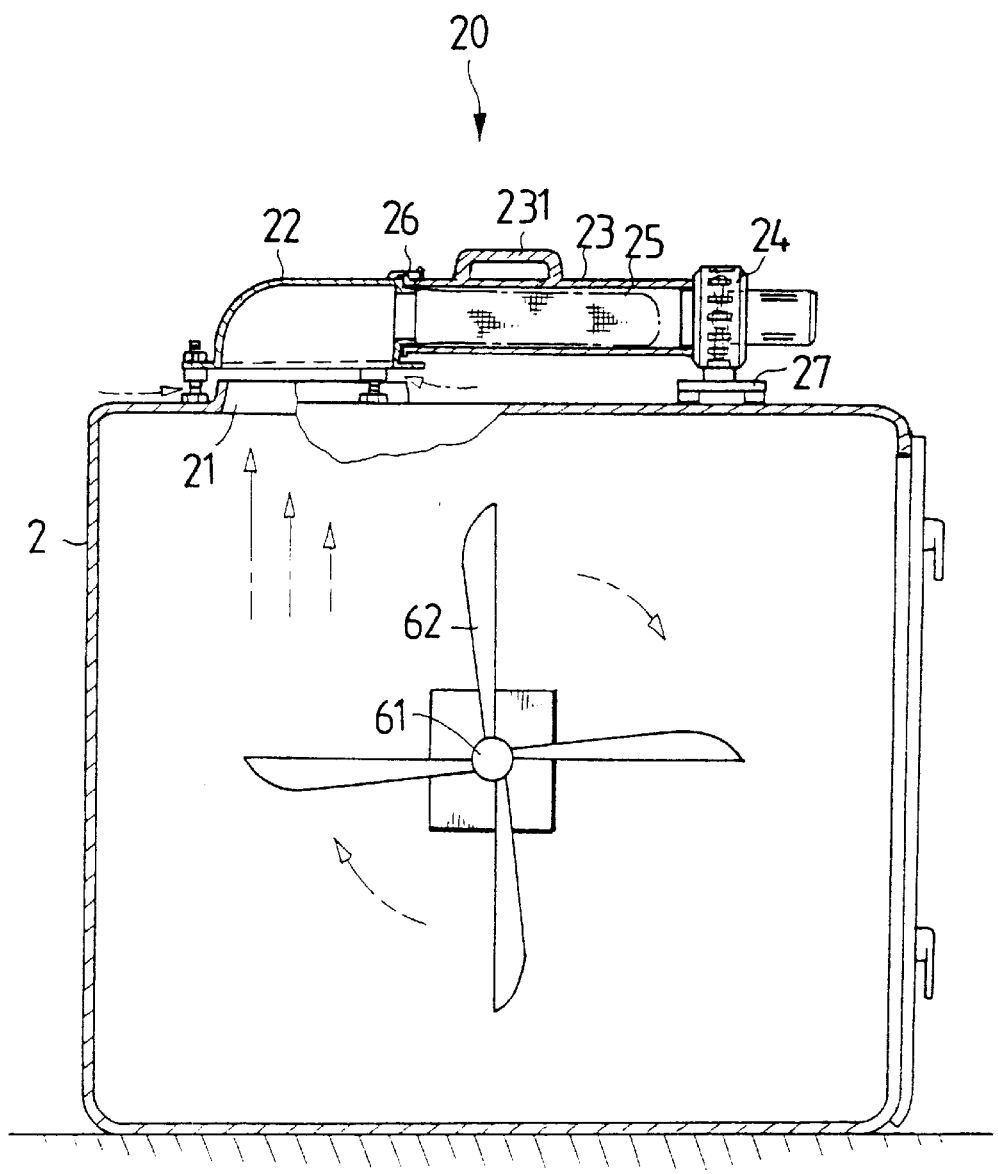
FIG. 10 is a sectional view of the hair collector.

As shown in FIGS. 9 and 10, two hair collectors 20 are installed on the top of the apparatus 2 and connected to the two adjustable air outlets 21. The hair collector 20 includes a curved tubular connector 22 engaged with a respective adjustable air outlet 21, an elongated tubular member 23 having an end connected with the curved tubular connector 22, an air blower 24 connected with the other end of the elongated tubular member 23, and a bag 25 arranged within the elongated tubular member 23. The curved tubular connector 22 is arranged above the air outlet 21 and there is a clearance between the curved tubular connector 22 and the air outlet 21. The elongated tubular member 23 is provided with a handle 231 at the top and coupling means 26 at the end for engaging with the curved tubular connector 22. The bag 25 is fitted within the elongated tubular member 23 and used for collecting hairs. The air blower 24 is fixedly mounted on a base 27 for keeping at a horizontal position. The bag 25 can be removed from the elongated tubular member 23 and replaced with a new one when it is full of hair.

Figure 11:
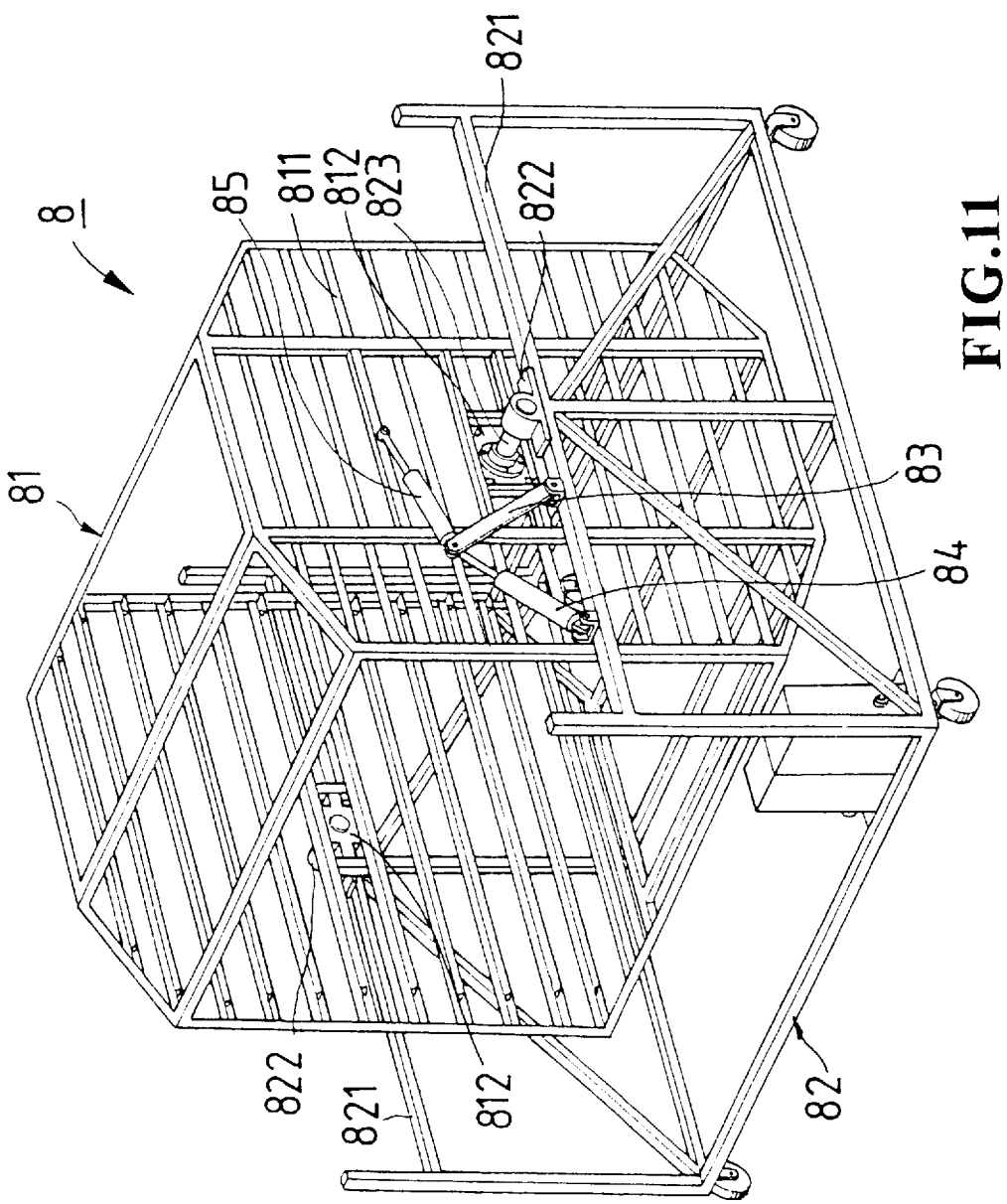
FIG. 11 is a perspective view of the egg rack.
Figure 12:
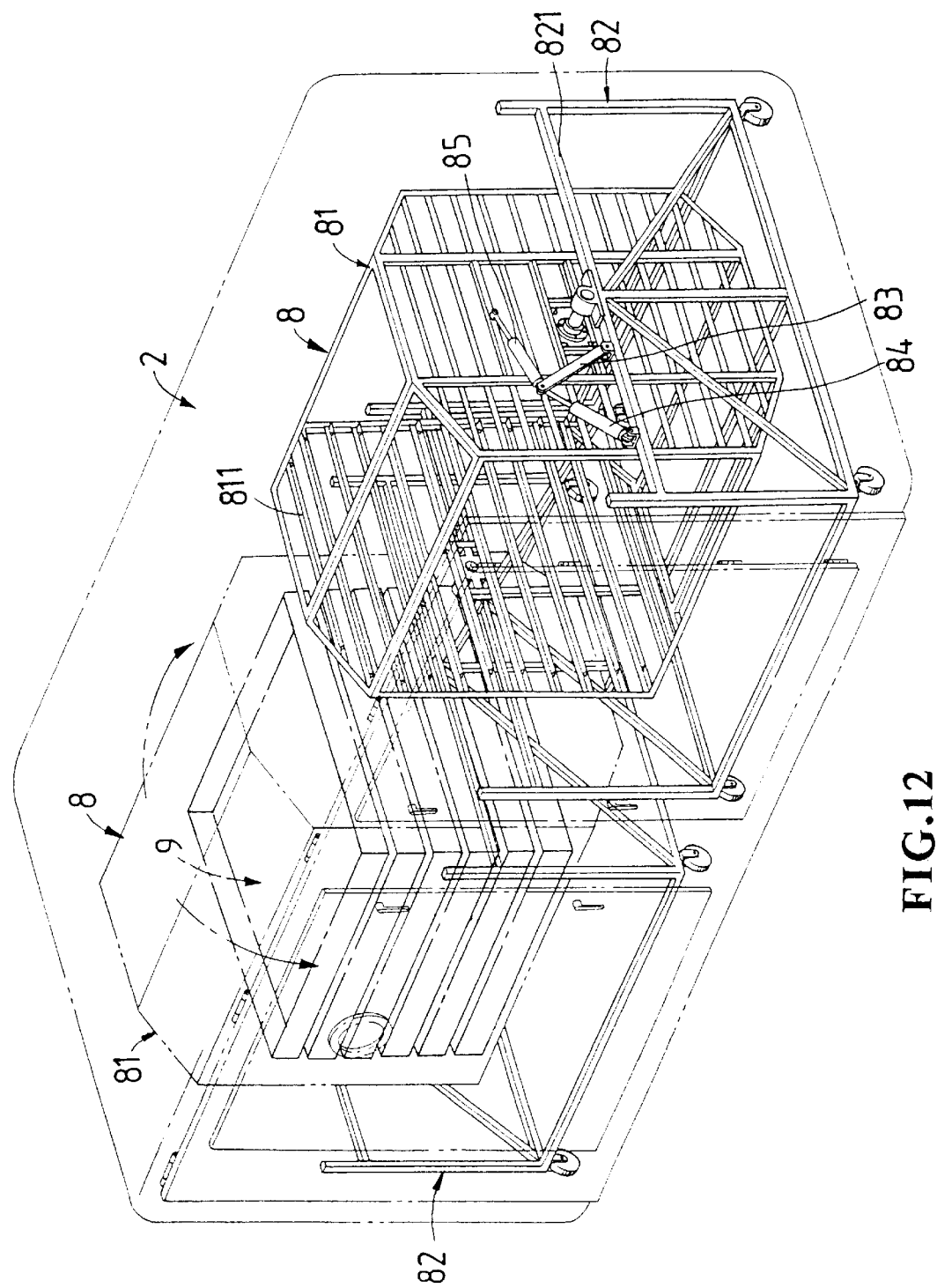
FIG. 12 illustrates two egg racks arranged within the apparatus for hatching eggs according to the present invention.

Within the rectangular casing there are mounted two eggs rotating racks 8. As shown in FIG. 11, the egg rotating rack 8 comprises a cage 81 and a wheeled frame 82. The cage 81 is octagonal in shape thereby preventing its angles from getting interference with the rectangular casing 2 (see FIG. 12). The cage 81 can be removed from the rectangular casing 2 so that a plurality of egg trays 9 can be conveniently put therein. Both sides of the cage 81 is provided with a plurality of transverse rods 811 for receiving a plurality of egg trays 9. The cage 81 is provided with two brackets 812 at two opposite sides. The wheeled frame 82 has two opposite sides 821 each provided with a bracket 822 which is aligned with the bracket 812 of the cage 81. An axle 823 extends through the bracket 822 of the wheeled frame 82 to the bracket 812 of the cage 81 so that the cage 81 can be rotated with respect to the wheeled frame 82. Each side 821 of the wheeled frame 82 is connected with a lower end of an arm 83 and a lower end of a first hydraulic cylinder 84. The other end of the arm 83 is connected to the other end of the first hydraulic cylinder 84 and an end of a second hydraulic cylinder 85. The other end of the second hydraulic cylinder 85 is connected to the upper portion of a respective side of the cage 81.

Figure 13:
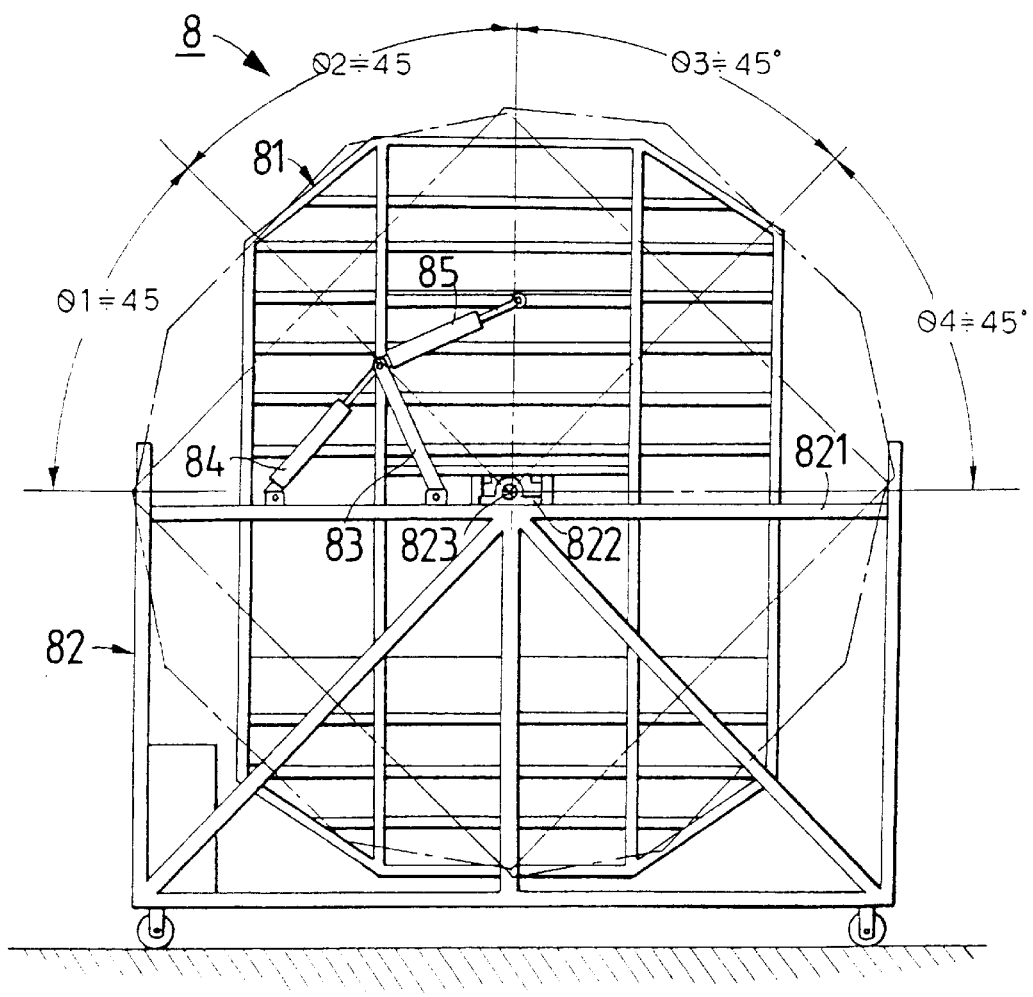
FIG. 13 shows the rotation of the cage.
Figure 14:
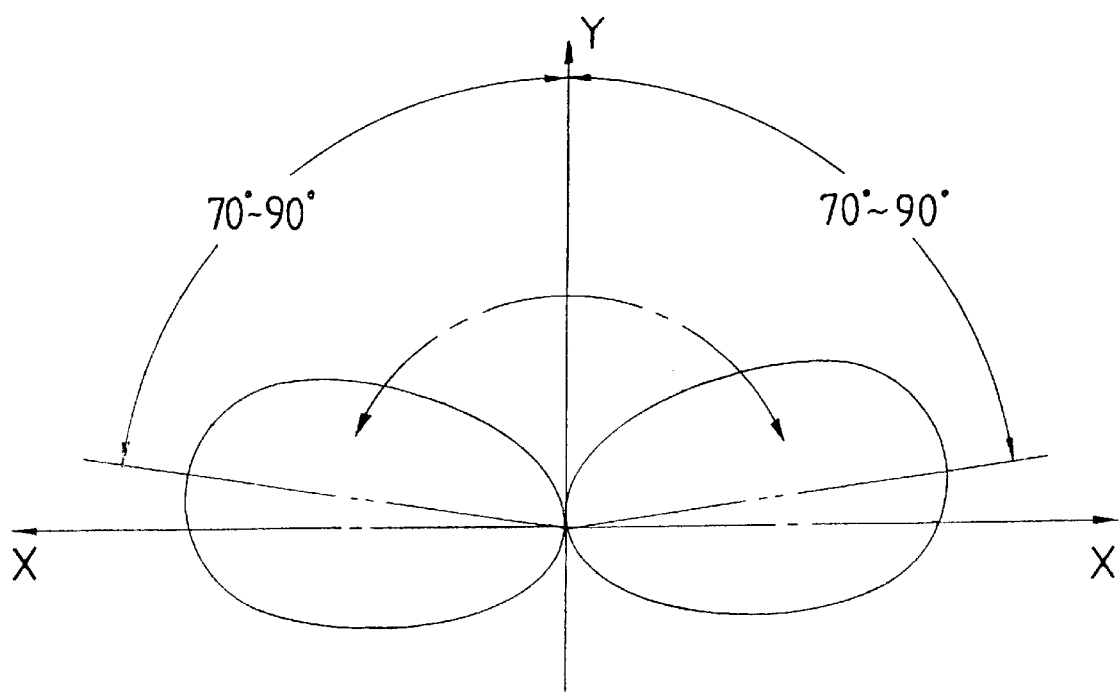
FIG. 14 shows the rotating range of the egg.

Referring to FIG. 13, when the first hydraulic cylinder 84 is actuated, the cage 81 will be rotated through an angle of 45 degrees in clockwise direction. Similarly, the second hydraulic cylinder 85 can also turn the cage 81 through an angle of 45 degrees in clockwise direction. Hence, if the two hydraulic cylinders 84 and 85 are actuated to extend outwardly together, the cage 81 will be rotated through an angle of 90 degrees in clockwise direction. However, if the two hydraulic cylinders 84 and 85 are actuated to retract inwardly, the cage will be rotated through an angle of 90 degrees in counterclockwise direction. The cage 81 is rotated once every three hours for preventing the egg yolk from keeping at a fixed position. Consequently, the eggs will be moved intermittently and disposed at a certain angle (70–90 degrees) for hatching (see FIG. 14).

Figure 15:
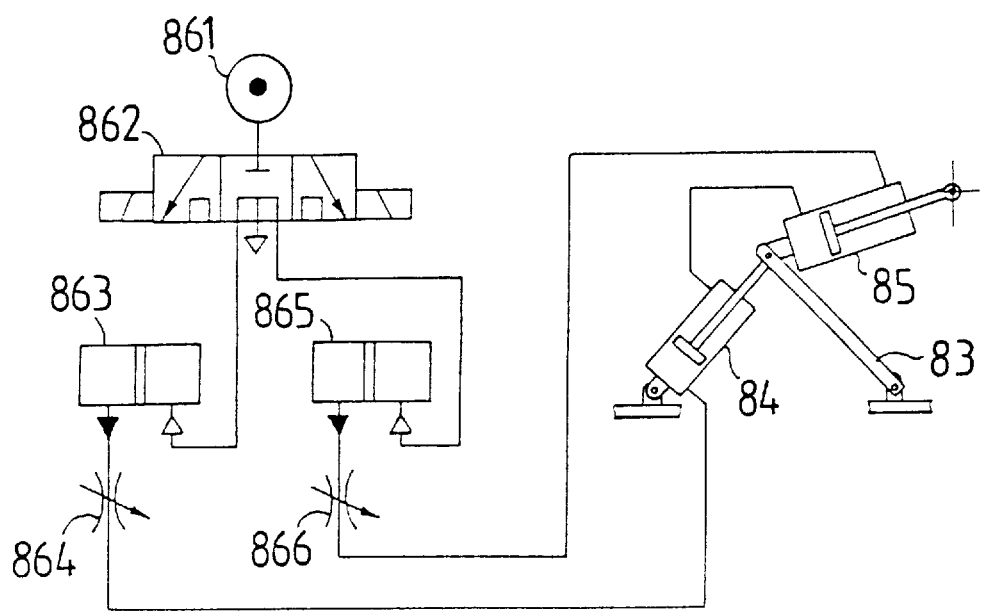
FIG. 15A shows a hydraulic circuit of the present invention.
FIG. 15B shows another hydraulic circuit of the present invention.
Figure 15:
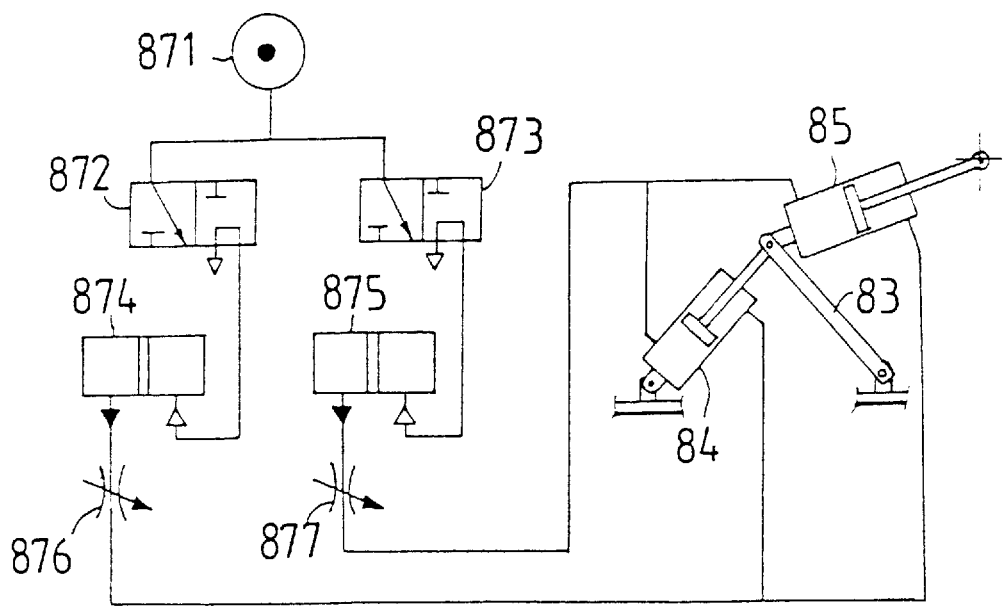

The two hydraulic cylinders 84 and 85 are connected in series, as shown in FIG. 15A. As illustrated, a compressor 861 is connected to a solenoid valve 862 which is in turn connected to an air and oil container 863. When the air is compressed, the oil will be forced to go through the steady flow valve 864 to enter into the hydraulic cylinders 84 and 85 thereby extending the hydraulic cylinders 84 and 85. When desired to retract the hydraulic cylinders 84 an 85, the solenoid valve 862 will be switched to let air flow into another air and oil container 865. Then, the oil will be forced to go through another steady flow valve 866 to enter into another ends of the hydraulic cylinders 84 and 85 thus retracting the hydraulic cylinders 84 and 85.

FIG. 15B illustrates how the hydraulic cylinders 84 and 85 are connected in parallel. As shown, a compressor 871 is connected in parallel with two solenoid valves 872 and 873 which are connected to two air and oil containers 874 and 875 respectively. The two air and oil containers 874 and 875 are connected to two steady flow valves 876 and 877 which are in turn connected to the two hydraulic cylinders 84 and 85 respectively.

Figure 19:
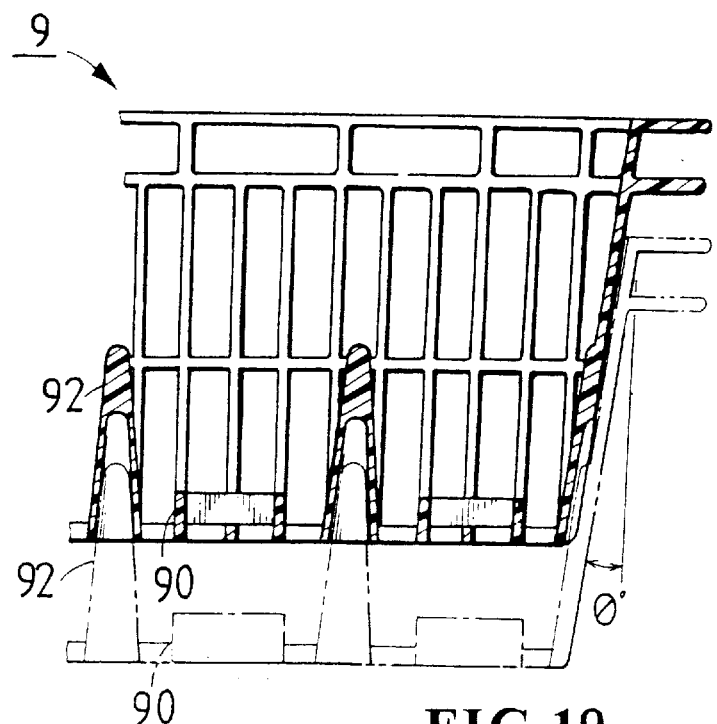
FIG. 19 illustrates how to stack up two hatching trays.

The egg tray 9, shown in FIGS. 16, 17 and 18, is provided with a plurality of equidistant frames 91 each having a plurality of lattices 90. Each lattice 90 includes a small cross frame 93. Each of the frame 91 has a plurality of supports 92 at two opposite sides close to the corners of each lattice 90 thus enabling an egg 10 to be vertically held in the lattice 90 by four supports 92 and protected by the small cross frame 93 at the bottom. Further, the support 92 is hollow in structure (see FIG. 19) so that the support 92 of an egg tray 9 can be fitted in the support 92 of another egg tray thereby enabling a plurality of egg trays 9 to be stacked up in a pile and therefore reducing the space for storing egg trays 9.

Figure 20:
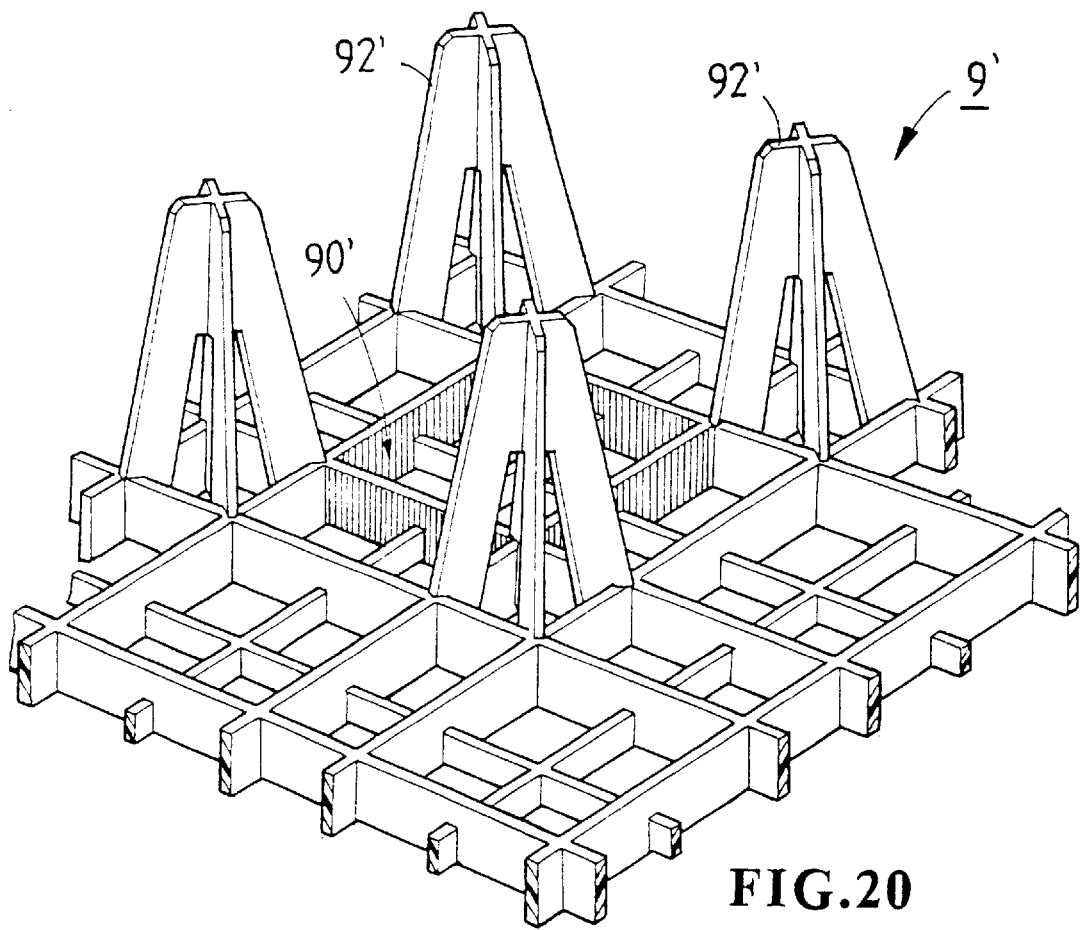
FIG. 20 is a perspective view of another preferred hatching tray.
Figure 21:
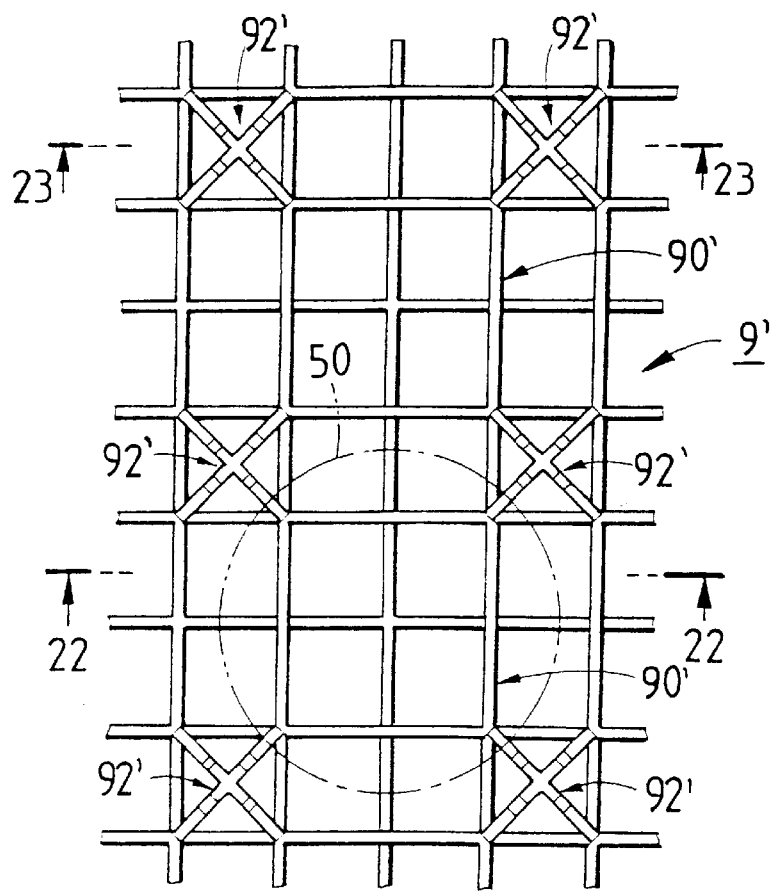
FIG. 21 is a fragmentary top view of the hatching tray of FIG. 20.
Figure 22:
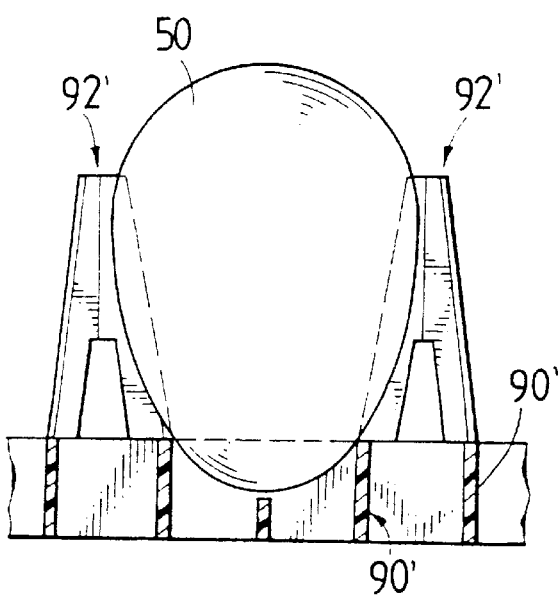
FIG. 22 is a sectional fragmentary view of the hatching tray of FIG. 20.
Figure 23:
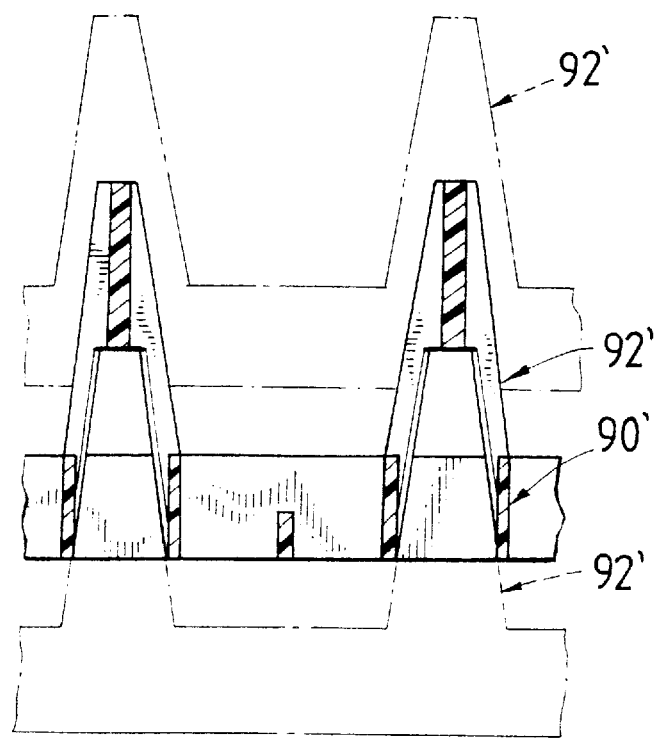
FIG. 23 illustrates how to stack up two hatching trays of FIG. 20.

FIG. 20 illustrates another embodiment of the egg tray. As shown, the egg tray 91 is charaterized in the support 92' at four corners of the lattice 90' is a cross-shaped tubular conical member so that an egg can be firmly kept within the lattice 90' (see FIGS. 21 and 22). In addition, a plurality of the egg trays 9' can be stacked up in a pile as shown in FIG. 21. It should be noted that the egg trays 9 and 9' can be also used as bearing trays.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

I claim:

1. An apparatus for hatching eggs comprising:
   a rectangular casing having a top provided with a pre-heating chamber in which is mounted a first electric fan and a water tray under said electric fan;
   an air compressor arranged on said top and connected with said pre-heating chamber via a pipe;
   a cooling water container installed on said top and connected with said water tray via a pipe;
   a second electric fan installed on a first inner end of said rectangular casing; and
   a third electric fan installed on a second inner end of said rectangular casing.

2. The apparatus for hatching eggs as claimed in claim 1, further comprising a first heating element mounted on said first inner end of said rectangular casing and surrouding said second electric fan, a first cooling pipe mounted on said first inner end of said rectangular casing, a second heating element mounted on said second inner end of said rectangular casing and surrouding said second electric fan, and a second cooling pipe mounted on said second inner end of said rectangular casing.

3. The apparatus for hatching eggs as claimed in claim 1, said rectangular casing is provided with at least one air outlet on said top.

4. The apparatus for hatching eggs as claimed in claim 3, wherein said air outlet is connected with a hair collector.

5. The apparatus for hatching eggs as claimed in claim 4, wherein said hair collector comprises a curved tubular connector engaged with said air outlet, an elongated tubular member having an end connected with said curved tubular connector, an air blower connected with another end of said elongated tubular member, and a bag fitted within said elongated tubular member.

6. The apparatus for hatching eggs as claimed in claim 5, wherein said elongated tubular member has fasteners engageable with said curved tubular connector.

7. The apparatus for hatching eggs as claimed in claim 1, wherein all corners of said rectangular casing are rounded.

8. The apparatus for hatching eggs as claimed in claim 1, further comprising an egg rotating rack which includes a cage and a wheeled frame, said cage provided with a plurality of transverse rods for receiving a plurality of egg trays, said cage being rotatably mounted on said wheeled frame.

9. The apparatus for hatching eggs as claimed in claim 8, wherein said wheeled frame is connected with a lower end of an arm and a lower end of a first hydraulic cylinder, another end of said arm being connected to another end of said first hydraulic cylinder and an end of a second hydraulic cylinder, another end of said second hydraulic cylinder being connected to an upper portion of a respective side of said cage.

10. The apparatus for hatching eggs as claimed in claim 9, wherein said first hydraulic cylinder is connected in series with said second hydraulic cylinder.

11. The apparatus for hatching eggs as claimed in claim 9, wherein said first hydraulic cylinder is connected in parallel to said second hydraulic cylinder.

12. The apparatus for hatching eggs as claimed in claim 1, further comprising a plurality of hatching trays each provided with a plurality of equidistant frames having a plurality of lattices, each of said lattices including a small cross frame having a plurality of supports at two opposite sides close to corners of each lattice.

13. The apparatus for hatching eggs as claimed in claim 12, wherein said supports are hollow in structure.

14. The apparatus for hatching eggs as claimed in claim 12, wherein each of said supports is a cross-shaped conical member.

* * * * *